United States Patent
Torgersrud et al.

(10) Patent No.: US 10,375,232 B2
(45) Date of Patent: Aug. 6, 2019

(54) CONSOLIDATED VOICEMAIL PLATFORM

(71) Applicant: Telmate, LLC, San Francisco, CA (US)

(72) Inventors: Richard Torgersrud, San Francisco, CA (US); Kevin O'Neil, Parma, ID (US)

(73) Assignee: INTELMATE LLC, San Francisco, CA (US)

( * ) Notice: Subject to any disclaimer, the term of this patent is extended or adjusted under 35 U.S.C. 154(b) by 0 days.

(21) Appl. No.: 14/621,325

(22) Filed: Feb. 12, 2015

(65) Prior Publication Data

US 2015/0256671 A1 Sep. 10, 2015

Related U.S. Application Data

(62) Division of application No. 12/826,168, filed on Jun. 29, 2010, now abandoned.

(51) Int. Cl.
*H04M 3/22* (2006.01)
*H04M 3/533* (2006.01)
*H04L 12/66* (2006.01)

(52) U.S. Cl.
CPC .......... *H04M 3/2281* (2013.01); *H04L 12/66* (2013.01); *H04M 3/533* (2013.01)

(58) Field of Classification Search
CPC ...... H04M 3/2281; H04M 3/533; H04L 12/66
See application file for complete search history.

(56) References Cited

U.S. PATENT DOCUMENTS

| | | | | |
|---|---|---|---|---|
| 5,926,533 A | * | 7/1999 | Gainsboro | H04M 3/2281 379/188 |
| 7,697,667 B1 | * | 4/2010 | Wageman | H04M 3/53333 379/142.06 |
| RE42,122 E | * | 2/2011 | Gilbert | H04M 3/53391 379/142.01 |
| 8,406,386 B2 | * | 3/2013 | Yin | H04M 3/533 379/88.11 |
| 8,594,318 B2 | * | 11/2013 | Liang | H04M 1/723 379/373.03 |
| 9,420,094 B1 | | 8/2016 | Keiser | |
| 9,712,669 B2 | * | 7/2017 | Khoshaba | H04M 3/42042 |
| 2003/0198325 A1 | * | 10/2003 | Bayne | H04M 15/08 379/114.21 |
| 2004/0120475 A1 | * | 6/2004 | Bauer | H04M 3/382 379/88.18 |

(Continued)

OTHER PUBLICATIONS

U.S. Appl. No. 15/238,411, Keiser.

*Primary Examiner* — Luat Phung
(74) *Attorney, Agent, or Firm* — Jeffri A. Kaminski; Venable LLP (57) ABSTRACT

A voicemail system for providing voicemail services to a secure facility. An embodiment of the voicemail system includes an internet router provided at a facility for communicating with a call processing center that is located outside the facility. A database at the call processing center stores voicemail messages, a call interface receives and stores voicemail messages for residents of the facility, a resident interface provides a plurality of residents of the facility with access to the stored voicemail messages via a telephone located at the facility, and a web server provides a plurality of authorized users access to the stored voicemail messages via a website.

10 Claims, 8 Drawing Sheets

(56) References Cited

U.S. PATENT DOCUMENTS

| | | | | |
|---|---|---|---|---|
| 2004/0208304 | A1* | 10/2004 | Miller .................. | H04M 1/663 379/210.02 |
| 2006/0256940 | A1* | 11/2006 | Pekarovic ............. | H04M 3/533 379/88.26 |
| 2010/0234004 | A1* | 9/2010 | Sweeney ............... | H04M 3/436 455/415 |

* cited by examiner

CONSOLIDATED VOICEMAIL PLATFORM

CROSS REFERENCE TO RELATED APPLICATIONS

This application is a divisional of co-pending U.S. patent application Ser. No. 12/826,168, filed on Jun. 29, 2010, entitled "Consolidated Voicemail Platform," and is herein incorporated by reference.

FIELD OF THE INVENTION

Embodiments described herein relate generally to voicemail technology, and more specifically to providing a consolidated voicemail system on a centralized call platform for a secure facility.

BACKGROUND OF THE INVENTION

Voicemail systems are used to store and retrieve voice messages, such as telephone voice messages. Developed initially for large corporations, voicemail technology has since expanded to small businesses and individual cellular and residential subscribers. Voicemail systems may be large centralized systems that mange a high volume of telephone messages for a business, or may be smaller systems, such as an answering machine in a home or a voice mailbox accessible by a cellular telephone subscriber.

More recently, large volume corporate voicemail has been significantly improved by the introduction of voice over IP (VoIP) technology, which implemented a standard for transmitting voice over the Internet. VoIP, technology enables centralization to shared severs and the ability to remotely manage enterprise accounts. It also enables users to access information from various devices including smart telephones, and laptop computers. The transition from legacy telephony technologies to IP (Internet Protocol) telephony has enabled greater flexibility, manageability, lower costs, reliability and speed in voicemail technology.

Voicemail has become a commonplace technology, and has recently included certain rudimentary security features, such as requiring a password to retrieve messages. Contemporary voicemail systems, however, lack certain additional security and accountability features required in secure facilities such as, e.g., government detention and treatment locations and other similar institutions. Even VoIP based systems do not provide many of the features required for secure facilities.

Voicemail has become a commonplace technology, and has recently included certain rudimentary security features, such as requiring a password to retrieve messages. Contemporary voicemail systems, however, lack certain additional security and accountability features required in secure facilities such as, e.g., government detention and treatment locations and other similar institutions. Even VoIP based systems do not provide many of the features required for secure facilities.

Voicemail is a potentially valuable service for secure facilities such a prisons and other government detention centers. Many facilities do not have sufficient staff to transcribe the phone messages, or do not allow the staff to do so for security reasons. Accordingly, written communication via the postal service is the primary means of communication between facility residents and outside friends and family. All mail must be opened, reviewed, screened for toxins, and delivered—a slow, unreliable, labor-intensive and expensive process. It is also difficult to archive and index this information for investigators. Voicemail systems can provide secure facilities with a fast and easy passage of essential information, if they could only provide the security and accountability features necessary for the environment. Thus, there exists a need for a voicemail system that provides security and accountability features suited for secure facilities such as prisons, government detention and treatment facilities.

DETAILED DESCRIPTION OF THE INVENTION

Embodiments described herein address the problems with current voicemail systems for secure facilities such as prisons or other government detention centers. The described embodiments provide a customized and consolidated voicemail platform for inmate telephones that extends traditional voicemail with the features required by secure facilities. Among other things, the described embodiments provide for the recording and archiving of all messages, and the review of recorded messages for investigation purposes.

Embodiments may be implemented using computer hardware or software, or a combination of both. Computer software implementing features of the embodiments may be stored as instructions on a tangible computer readable medium. References to the "system" or "platform" describe specific embodiments and do not limit the scope of the claimed invention.

Though embodiments are described with reference to facilities such as prisons or detention facilities, the embodiments described herein could be used in any facility requiring consolidated security and accountability in a voicemail messaging solution.

It should be understood that embodiments of the invention are not limited by the example embodiments described herein and that changes can be made thereto. Example embodiments are now described with reference to the accompanying Figures wherein like reference numbers are used consistently for like features throughout the drawings.

Figure 1:
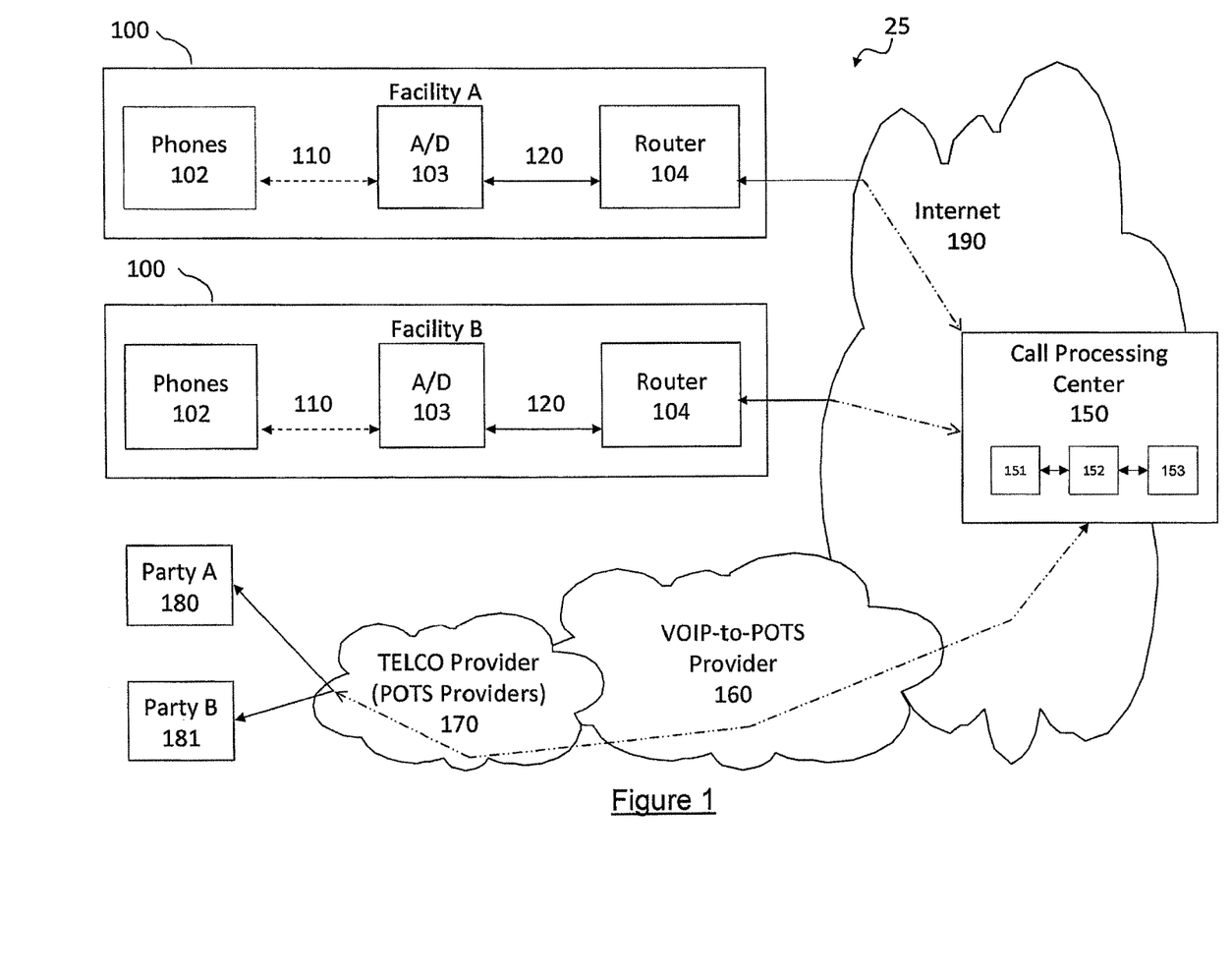
FIG. 1 illustrates an embodiment of the central call platform.

FIG. 1 illustrates an embodiment of an example a central call platform 25. The platform 25 includes a call processing center 150 connected to one or more facilities 100 through a network such as, e.g., the Internet 190. Facilities 100 may be any facilities requiring telephone service, especially those with security requirements and a large call volume, including secure facilities such as prisons or other government detention facilities. At each facility 100, there are telephones 102 that may be standard telephones connected using traditional telephone communications links 110, such as full duplex wiring for voice communications used in the "plain-old telephone service" ("POTS") standard. Alternatively, the telephones 102 could be digital telephones that communicate over a digital network or communication link, for example using an Ethernet connection and a power source provided by a standard outlet or as Power-Over-Ethernet. In the FIG. 1 example, the telephones 102 are analog and communicate via POTS.

Each telephone 102 at the secure facility 100 is connected to an analog-to-digital ("A/D") converter 103. A/D converters 103 convert an analog signal (such as a POTS signal) to a digital signal for transmission over digital networking links 120 (such as, e.g., Ethernet connections). The A/D converters 103 may, for example, be ADTRAN Total Access 900 series single T1 IP business gateways designed for carrier VoIP networks. The A/D converters 103 may output a signal using proprietary protocols for voice communications, or may use standard protocols, such as voice over IP (VoIP) protocols Session Initiation Protocol ("SIP"), Inter-Asterisk eXchange ("IAX"), and Real-time Transport Protocol ("RTP").

The A/D converters 103 are each connected to a router 104 via a networking link 120. The routers 104 are configured to communicate with the call processing center 150, which may be distributed across several locations. The routers 104 each connect the communications received via the A/D converters 103 to the Internet 190, and exchange IP (Internet Protocol) packets bidirectionally between the call processing center 150 and facility 100.

The telephones 102, A/D converters 103, and routers 104 may all be physically located at a facility 100. Calls placed from a facility telephone 102 are converted by the A/D converters 103 and transmitted via the routers 104 to the call processing center 150. The call processing center 150 includes application hardware and software for call processing and other functions described below.

The call processing center 150 is a system that is distributed across multiple clusters 151-153, which may or may not be geographically diverse (described below in more detail). Each cluster 151-153 hosts multiple nodes, including an application node, a database node, and a call processing node (discussed below in relation to FIG. 2). The clusters 151-153 communicate with each other via the Internet or dedicated connections, and information in any database node can be shared among the clusters 151-153. Data storage and retrieval can be performed across several clusters. The clusters 151-153 can also provide fail-over for one another, and routers 104 at each facility may be configured to communicate with another cluster if a primary cluster is unavailable. Similarly, resources of the nodes within a cluster (which may include multiple computers) can be reallocated as processing needs require.

The call processing center 150 routes telephone calls from facility telephones 102 to their ultimate destinations 180, 181. To accomplish this, the call processing center 150 communicates via internet protocol to a "VoIP-to-POTS" provider 160, which converts VoIP communications to POTS communications. Example VoIP-to-POTS providers 160 include Paetech, Level 3, and Verizon. After converting the VoIP signal to a POTS signal, the VoIP-to-POTS provider 160 provides the communication to a telecommunications provider 170 that routes the call to the called parties 180, 181.

The call processing center 150 may be in communication with multiple VoIP-to-POTS providers 160, and may route communications to any one of the providers 160 based on various factors including time-of-day, load, or rates. Similarly, the call processing center 150 or the VoIP-to-POTS provider 160 may route calls to various telecommunications providers 170 based on factors including time-of-day, load, or rates. For example, VoIP-to-POTS providers 160 often have connection limits. Therefore, the call processing center 150 may be configured to first attempt a connection to a primary VoIP-to-POTS provider 160 with a low rate for a given call destination. If that connection is refused, then the call processing center 150 would be configured to attempt connections to a second, and perhaps third VoIP-to-POTS provider 160 until a connection is established.

The call processing center 150 can also receive calls from outside parties 180, 181 and route the calls to facility telephones 102. The VoIP-to-POTS provider 160 may convert the POTS signal to a VoIP signal before the communication is sent to the call processing center 150. Alternatively, although not shown in FIG. 1, the outside callers 180, 181 may place a call using the traditional telecommunications provider 170 and may be directly connected to the call processing center 150 where the signal is converted using an A/D converter similar to the A/D converters 103 used at the facilities 100. The call processing center can connect outside callers 180, 181 to residents and can also allow outside callers 180, 181 to leave voicemail messages.

When an outside caller 180, 181 is connected to a call processing center 150, they are presented with an interactive voice response (IVR) system, which is a computerized system that plays recordings prompting users to input information via voice, telephone touch tones, or other available input methods. The call processing center 150 uses the automatic number information (ANI) within the call, similar to caller ID, to identify the outside caller 180, 181, and any resident associated with that caller. The call processing center 150 associates residents with an outside caller 180, 181 when a resident calls the number, or when an outside caller 180, 181 adds funds to a resident's account.

The IVR system of the call processing center 150 asks an outside caller 180, 181 if they would like to leave a voicemail or call the resident associated with the callers caller ID. If there are no associated residents, then the outside caller 180, 181 may be transferred to a customer service operator, who will assist them. If more than one resident is associated with a caller, the IVR system enables selection of a particular resident.

If an outside caller indicates that they wish to place an incoming call, the call processing center 150 checks criteria including: (1) whether the facility allows incoming calls; (2) whether calls are allowed at the present time; (3) whether the resident has permission to receive incoming calls; (4) whether the outside caller 180, 181 has permission to call the particular resident; (5) whether the system knows the current location of the resident; and (6) whether the caller has sufficient funds to complete the call. If the criteria fail, the caller is notified via IVR, and a reason for failure may be noted. The outside caller 180, 181 may then be asked to leave a voicemail. If the call fails due to insufficient funds, the caller may be asked to add funds.

If the call is allowed, the call processing center 150 will connect to the facility 100 via the Internet 19, and will play a distinctive ring on a telephone 102 in the resident's current location. The ring may be one of multiple different available rings, and each resident may be assigned a different ring. If all phones are in use, the outside caller 180, 181 will hear an IVR message notifying them that all phones are currently in use, and they will be asked to leave a voicemail message.

If a phone in the resident's location is answered, a message will play for the resident requesting that the resident enter their unique personal identification number (PIN) (e.g., "This is an incoming call for <NAME>. If you are <NAME> please enter your PIN now."). The message plays for a predetermined amount of time (e.g., 60 seconds) and if the PIN number is not entered correctly in this time, the message will terminate and the outside caller 180, 181 will be asked if they wish to leave a voicemail. If the telephone 102 is placed back on hook, the incoming call is terminated and the outside caller is asked if they wish to leave a voicemail. If the resident successfully keys in their PIN and passes a secondary voice verification step (which matches the resident's voice with a pre-recorded voice ID), the outside call is connected.

All incoming calls are processed through the same call processing center 150 as an outgoing call. This enables the enforcement of all existing rules regulating resident communications at each facility, such as recording, monitoring, time limits, schedule, and three way call detection. The call processing center 150 allows incoming calls to be completed at rates that are the same as outgoing calls, or different, depending on facility preference or other factors.

The use of a call processing center 150 allows one incoming number to be used to call any resident at any facility that allows the feature. An outside caller 180, 181 that communicates with multiple residents at multiple facilities is able to make calls to, and leave voicemails for, any resident by calling the same number. The system can be configured to prevent abuse and fraud by, for example, only allowing residents who have contacted a destination number to receive calls from that number.

The call processing center 150 can be configured to log all attempts to reach a resident via an incoming call even when a call does not succeed. These attempts can be associated both with the resident's record and with the outside caller's record. This enhances security and facilities investigations. Incoming calls can be set to trigger alerts just as outgoing calls can, allowing investigators to be notified if a particular outside caller 180, 181 attempts to contact a resident, or if a resident receives and incoming call.

Figure 2:
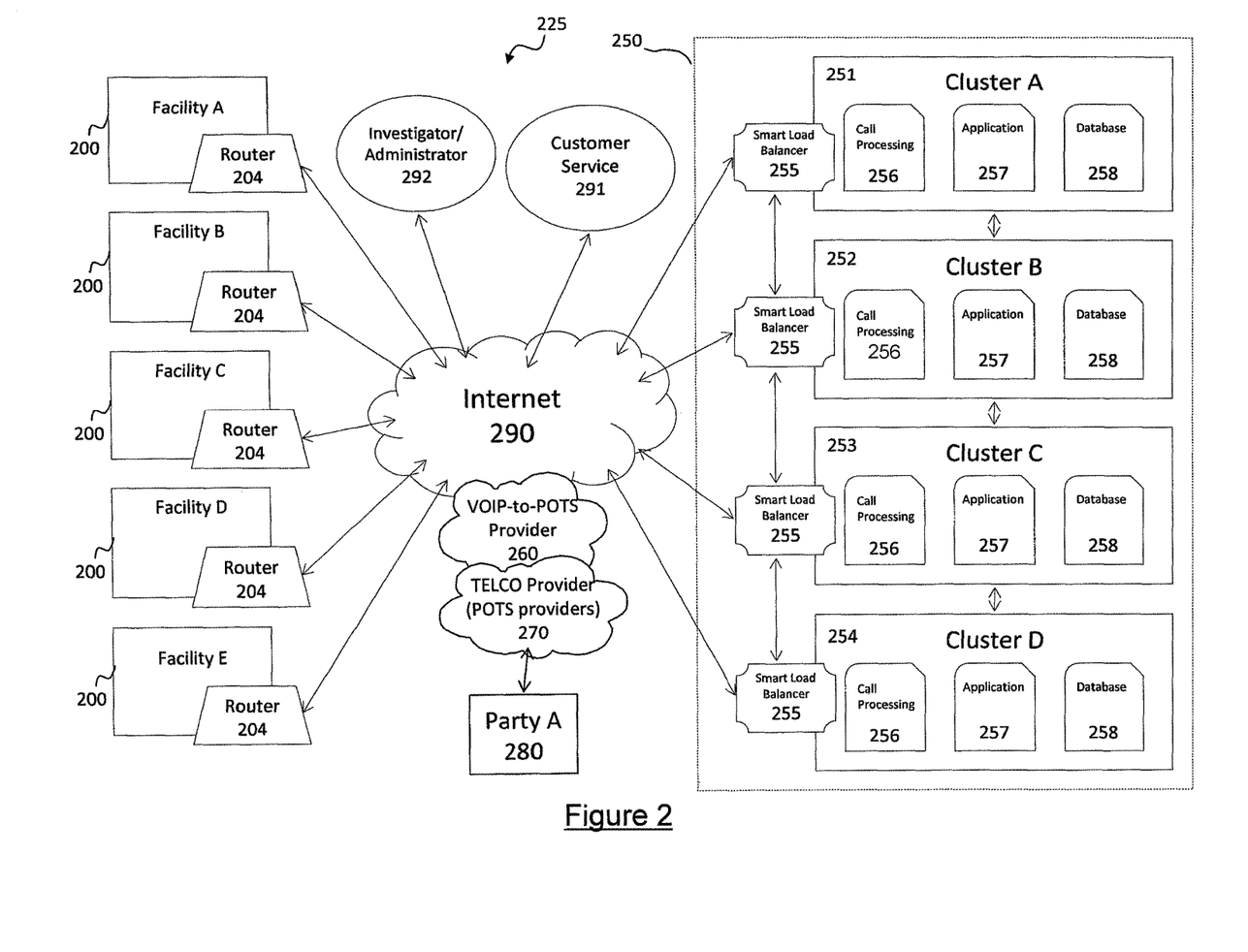
FIG. 2 illustrates the organization and interaction of clusters of a central call platform.

FIG. 2 is a system diagram showing the organization and interaction of clusters of another example central call platform 225. FIG. 2 illustrates multiple facilities 200, each connected to the Internet 290 via a router 204. The facilities 200 communicate, via the Internet 290, with a call processing center 250 that is made up of multiple call clusters 251-254.

FIG. 2 illustrates a first call processing cluster 251 in location A, a second call processing cluster 252 in location B, a third call processing cluster 253 in location C, and a fourth call processing cluster 254 in location D. The call processing clusters 251-254 together operate as the call processing center 250, and each cluster may include one or many computers functioning together to perform various tasks. The call processing clusters 251-254 may be located in different geographic regions, and one or more of the call processing clusters 251-254 may function as backup clusters or overflow clusters, operating only when other clusters are unavailable or overloaded.

The routers 204 at each facility 200 may be configured to route communications for a particular facility to a predetermined call processing cluster, and may be set to route communications to another call processing cluster if the predetermined call processing cluster is unavailable. Alternatively, the routers 204 may be configured to distribute communications across multiple processing clusters according to a predetermined ratio (described below). These two configurations may be used alternatively or in conjunction with one another, and their use could be determined based on the traffic load on a network.

The routers 204 may also be configured to route communications over multiple outbound network connections at each facility 200. The router 204 may be configured to use a second network connection when a first network connection is unavailable. For example, a facility may be serviced (i.e., communication with the outside world) by a DSL line and a T1 line, and the DSL line may be used as a backup when the T1 line becomes unavailable. As mentioned above, a router 204 may also be configured to distribute communications across multiple network connections according to a predetermined ratio. For example, if a facility is serviced by multiple T1 lines, the router 204 may be configured to distribute the call-data load across the T1 lines to a single cluster, or multiple clusters, allowing a large capacity of calls to be carried simultaneously. These configurations may be used alternatively or in conjunction with one another, and their use could be determined based on the traffic load on the network.

Each call processing cluster 251-254 includes multiple nodes each performing various functions. A call processing cluster may be one computer that is divided into virtual servers, each of which is treated as a node in the cluster. Alternatively, each node may be a dedicated computer, or multiple computers can form each node. Servers can be added as necessary to increase capacity of the cluster.

An example cluster for use in a secure facility is now described. Secure facilities, such as prisons, have unique features that must be addressed by the central call platform 225. For example, residents have limited access to cash, and so the central call platform provides various ways of paying for telephone access. An account is established for each resident, and funding of the account is provided via kiosks, calling cards, and an interactive voice response system. Provisioning for outside funding may also be desirable. Accordingly, the platform 225 may provide for funding of an account by an outside party via live customer service, an interactive voice response system, a website, or kiosks in visiting areas of the facilities.

The central call platform 225 may also allow collect calls to be placed by residents. A common problem with collect call systems is that, because a called party may not recognize the number or know what individual from the facility is calling, there must be a way for a resident to identify themselves. In traditional collect call systems, an individual may be allowed to record their name to be played to a called party. This, however, can permit the transmission of a short message without payment for use of the system. Accordingly, the call platform 225 may instead retrieve and play an audio clip of the inmates name that was recorded under supervision, or that was recorded by another party, or generated by a voice synthesizer.

System accounts must be tied to particular facility residents and must be only accessible by those facility residents. To accomplish this, the platform 225 may require a resident, upon accessing the system, to enter a unique PIN number that is associated with the resident. Additional PIN numbers may be required to access voicemail or other secure features.

The central call center 250 may also include voice recognition features, requiring a resident to state its name to authenticate his/her identity.

Secure facilities also often place restrictions on the communications of residents. Accordingly, the central call platform 225 is able to automatically restrict a resident from making calls to certain numbers based on restrictions noted in the residents' accounts. Similarly, the central call platform 225 prevents outside callers from leaving voicemail messages for inmates that are restricted from communicating with the outside caller. The central call platform 225 may also place time limits on calls, and may include audio warnings that a call may be cut off due to time restrictions.

Secure facilities also require call logging and monitoring capabilities. The logging may include storing information such as when the call was made, to whom, and how long the call lasted. Full audio recording of calls may also be necessary in prisons, for example, where virtually all calls need to be recorded and retrieved by investigators. Investigators may also need to monitor live calls. These functions can be automated by the central call platform 225. The central call platform 225 may also be set to not record certain calls, such as calls between an inmate and his attorney. This can be automated by including attorney numbers on a "do-not-record" list for the system or resident's account or by providing an option to request that a call not be recorded via an interactive voice response system. The request may be reviewed by a live call operator for authenticity, or may be logged for further review to detect abuse.

Many of these features are implemented using an IVR system provided by the call processing center 250. A facility resident may, for example, add funds to an account, make a call using funds, make a collect call, leave messages for administrators of a secure facility or customer service, or access a voicemail inbox.

Each call processing cluster 251-254 includes a call processing node 256. The call processing node 256 hosts an automated operator, audio routing, and audio recording functionality. The call processing node 256 is also responsible for digital signal processing. The automated operator may be an IVR system. Audio routing and recording may be used to process and route calls to destination parties, or to record and retrieve voicemail messages or call records. The call processing node 210 may be one or many computers functioning together to form the node.

The call processing node 256 is responsible for routing calls to telecommunications providers 270. A distributed carrier system allows clusters to access multiple VoIP-to-POTS providers 260 and telecommunications providers 270 to terminate any call. If one carrier is overloaded, the call processing node 256 will seek the next available carrier based on a set of predefined rules that govern priority. Priority can be set based on factors such as rate, time of day, call termination point, and carrier load. The call processing node 256 may optionally track the number of connections sent to a single carrier, and automatically route calls to a different carrier based on the carrier load. Call processing administrators can adjust the priority at any time via a single, dedicated interface.

Each call processing cluster 251-254 includes an application node 257. The application node 257 hosts payment validation, security, user interface, and business logic functionality. Business logic functionality includes all the rules governing a call. This could include, for example, fraud prevention and protection, schedule limits defined per resident, facility, phone, or destination number, or alarms for triggering investigation. The application node 257 is also responsible for implementing rules related to call acceptance, blocking, and recording. The application node 257 can be accessed by authorized users via a web page. By accessing the application node, administrators and investigators 240 can retrieve recorded calls, and can review records and adjust settings, such as calling or voicemail permissions for facility residents. Customer service personnel 241 can also use a web page to review issues reported by facility residents or outside callers. The application node 257 may be one or many computers functioning together to form the node.

Each call processing cluster 251-254 also includes a database node 258. The database node hosts settings for the business logic functionality. The database node 258 also stores indexed call logs, call recordings, voicemail recordings, and settings for individual residents and facilities. The database node 258 may be one or many computers functioning together to form the node. The database nodes 258 at each call processing cluster 251-254 may replicate some or all of the data at another database node. Since some facilities may impose rules regarding the geographic location where their data is stored, the call processing cluster 251-254 may include rules that define the data that the databases will replicate for each facility.

Call processing clusters 251-254 are connected to a communications network and to one another via smart load balancers 255. The smart load balancers 255 may be configured to communicate with one another over the Internet or through a dedicated communications network or link. The smart load balancers 255 may be configured to communicate to periodically update status information stored at each smart load balancer. The smart load balancers 255 can accordingly redirect incoming communications received from routers 204 based on the availability or load on a particular call processing cluster, and can redirect outgoing communications based on the responsiveness of a provider network.

Call processing clusters 251-254 can also share and retrieve data from one another directly via a communications link or over the Internet. For example, if a user at Facility A makes a request for voicemail, and the request has been routed to call processing cluster 251, but the actual recording is stored on call processing cluster 252, cluster 251 can retrieve the audio from cluster 252 for playback. Similarly, an investigator listening to call recordings via the web site interface can be communicating with the application node 257 using any call processing cluster 251-254 and can retrieve call recordings from any cluster. Voicemail and call recordings can be stored at multiple geographically diverse locations and may be backed up at separate locations for redundancy. A call processing cluster 251-254 can identify a storage location of call data by referencing a cluster identifier that is included with each piece of call data in a database node 258. Accordingly, the databases storing audio do not need to be replicated across clusters (though they can be).

The multiple call processing clusters 251-254 provide full cluster fail-over. That is, if one of the call processing clusters 251-254 fails, the routers 204 at the facilities are configured to automatically seek and connect to another cluster. Similarly, the smart load balancers 255 are configured to redirect incoming and/or outgoing communications when a particular cluster 251-254 is unavailable or nonresponsive. In both instances, the other cluster can take over call processing duties and allow communications to continue. Using multiple computers at each node of a cluster ensures that, if a single node in the cluster fails, another node can take over all of the functions of the failed node. Resources of a node in a cluster may be reallocated based on processing requirements. This all happens seamlessly without affecting configurations at the facilities 200 or the routers 204.

The described central call platforms include numerous advantages over existing platforms. The described platforms require minimal facility-hosted equipment, generally limited to the telephones themselves, an A/D converter, and a router or VoIP gateway. The router or VoIP gateway can reroute all audio originating or terminating at the telephone to the central call platform.

By removing the call processing center 150, 250 from the facility 100, 200 and distributing it across multiple clusters, sensitive computer hardware can be housed in special environmentally controlled and secure hosting environments that may be geographically dispersed. Clusters of computer hardware can operate independent of one another, allowing for redundancy and failovers. If a cluster completely fails, another functional cluster can take over all computing processes. Additionally, an individual cluster is redundant within itself, so that should any node of the cluster fail, resources can be reallocated to perform the required functions of the node.

Computing clusters can handle large volumes of call traffic from multiple locations more effectively than non-cluster solutions. This is a result of clusters being able to adapt to call load and expand capacity as needed. The resources within a cluster 251-254 can also be adjusted dynamically as service needs require. For example, if a call processing node 256 becomes overloaded, resources can be redirected from another node. This applies across clusters 251-254 as well; if a cluster starts to come under heavy load or become nonresponsive, connected clients can be shifted to a different cluster.

Multiple clusters also facilitate maintenance and expansion, as they allow operations at a single location to be interrupted for planned or unplanned servicing without bringing down communications. Clusters allow near limitless scalability as service needs expand. This can be accomplished by increasing computing capacity of the cluster, with no downtime. This also leads to hardware cost savings as service capacity can be increased with minimal hardware investment. Services within a cluster can be upgraded, or computing capacity added without affecting service availability. Higher uptime results in enhanced revenue. Fast replacement and maintenance is facilitated by having service personnel and replacement equipment in close proximity to a small number of cluster locations.

A voicemail platform used in a secure facility has unique requirements. The voicemail platform must be able to identify a particular resident using the telephone so that each resident can only access their own voicemail box. The voicemail platform must also be able to provide restrictions on use by residents, so that the facility can block communications between a resident and certain outside parties. Provisioning for payment by callers and residents on a per-message basis may also be provided. Additionally, all voicemails must be logged and archived so that facility administrators can retrieve and review messages. The voicemail platform may also provide other advantageous features such as centralized management, scalability, and distribution of processing. These and other requirements are fulfilled by embodiments of the voicemail platform now described with reference to FIGS. 3-8.

Figure 3:
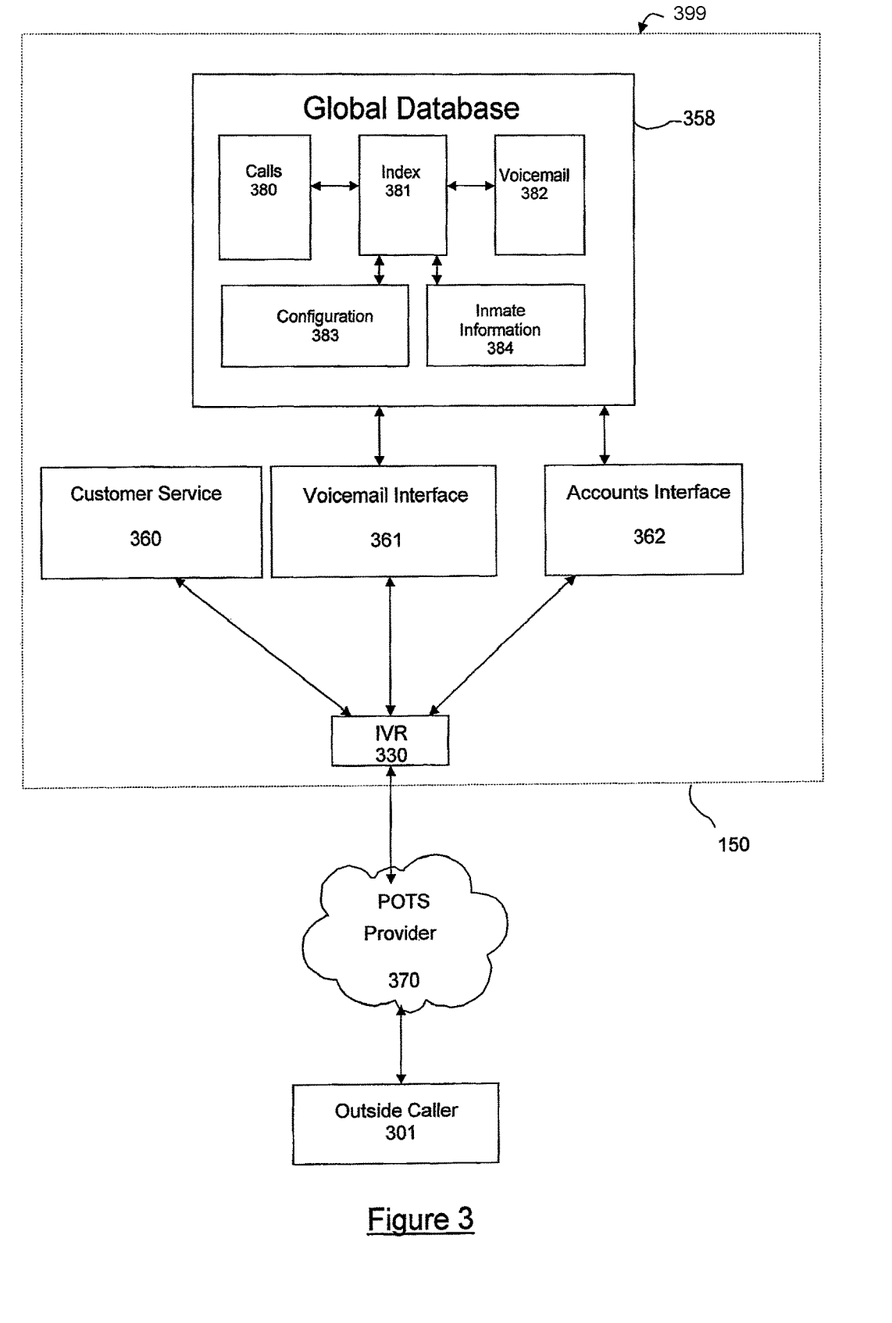
FIG. 3 illustrates an example embodiment of the consolidated voicemail platform and equipment used to provide access to an outside caller.

FIG. 3 illustrates an embodiment of a consolidated voicemail platform 399 and equipment used to access the voicemail platform by an outside caller 301 (i.e., a non-resident of the facility). The voicemail platform 399 includes resources provided at a call processing center 150 which may be distributed across multiple clusters 151-153 (FIG. 1). The call processing center 150 provides a global database 358, which can be spread across the clusters 151-153 of the call processing center 150. Since the clusters 151-153 are in communication with one another, the individual databases at the clusters 151-153 may be used to provide information physically located at one call processing center to users accessing a call processing center at another location. Among other things, the global database 358 includes call recordings and related information 380, voicemail recordings and related information 382, information on the configuration for a facility 383, and information about a resident 384, including calling permissions, all organized by an index 381. The call processing center 150 also provides an IVR interface 330, which can be accessed by outside callers 301. The IVR interface 330 provides access to customer service 360, a voicemail interface 361, and an accounts interface 362.

An outside caller 301 accesses the voicemail platform 399 using a conventional telephone or cellular telephone through a POTS provider 370. Once connected, the outside caller 301 is greeted by an IVR menu provided by the IVR interface 330, which presents the outside caller 301 with the options available on the voicemail platform 399. The caller can select an option using number keys on its telephone, voice commands, or any other suitable IVR interaction method. The equipment providing the IVR interface 330, and all other equipment of the voicemail platform 399, may be located at a call processing cluster 151-153 of a call processing center 150, as illustrated in FIG. 1.

The voicemail platform 399 is unified across multiple facilities, so outside callers 301 associated with residents at any one of multiple facilities can call a single phone number for service. This phone number also allows the outside caller 301 to leave voicemails for residents at any of the facilities serviced by the voicemail platform 399. The distributed nature of the voicemail system and the call processing center 150 allows voicemails to be stored on one cluster of the call processing center 150 and reviewed via another. This all happens seamlessly without notice to the end user.

A single call-in number allows the outside caller 301 to check account balances, search and locate facility residents by country, state, facility, and name, record voicemails for residents, add funds to an account via credit card, and contact customer service. As illustrated in FIG. 3, the outside caller 301 can, via the POTS provider 370 and IVR interface 330, contact customer service 360, accounts 362, or the voicemail interface 361. Accessing customer service 360 will place the outside caller 301 in contact with live customer service personnel to answer questions and provide services to the outsider caller 301. An outside caller 301 accessing the voicemail interface 361 is given additional prompts to enable the caller to record voicemail messages for residents of the facility. Voicemail messages are stored at the global database 358.

The accounts interface 362 option allows the outside caller 301 to add funds to a resident calling account, or to the outside caller's own calling account (used primarily to leave voicemail messages). The accounts interface 362 also enables the outside caller 301 to access information on bail balances. When the outside caller 301 connects to the IVR interface 330, the system attempts to match the outside caller's telephone number to a resident that has called the number in the past by searching records in the global database 358. If any of the identified residents have active bail information (also located in the global database 358) it will be read back by the IVR interface 330 by an automated voice. After reading the bail amount, the system will allow the caller to pay the bail amount over the phone via a credit card, or be connected to live customer service to pay the bail amount via another payment method. It should be appreciated that by avoiding manually locating the amount of a resident's bail, valuable resources of the facility are freed.

To provide fast routing of calls and other services, the global database 358 stores records including destination phone numbers called by residents, residents associated with a destination, accounts for residents and destinations, facilities associated with a destination, facilities associated with a resident, and other information. The global database 358 is used for all facilities, but at the same time preserves the security and integrity according to specific facility requirements. The centralization of these services for many facilities increases efficiency and scalability.

Consolidating services for multiple facilities also enables a voicemail provider to support the facilities using a centralized user interface. For example, the centralized IVR interface 330 allows outside callers to call a single number to leave voicemail messages or perform other tasks. A centralized web interface (discussed in more detail below) enables the provider, administration officials, and customer service to search, locate, and listen to recorded messages or access other stored information regardless of the individual or facility. This enables shared support services across multiple facilities.

Figure 4:
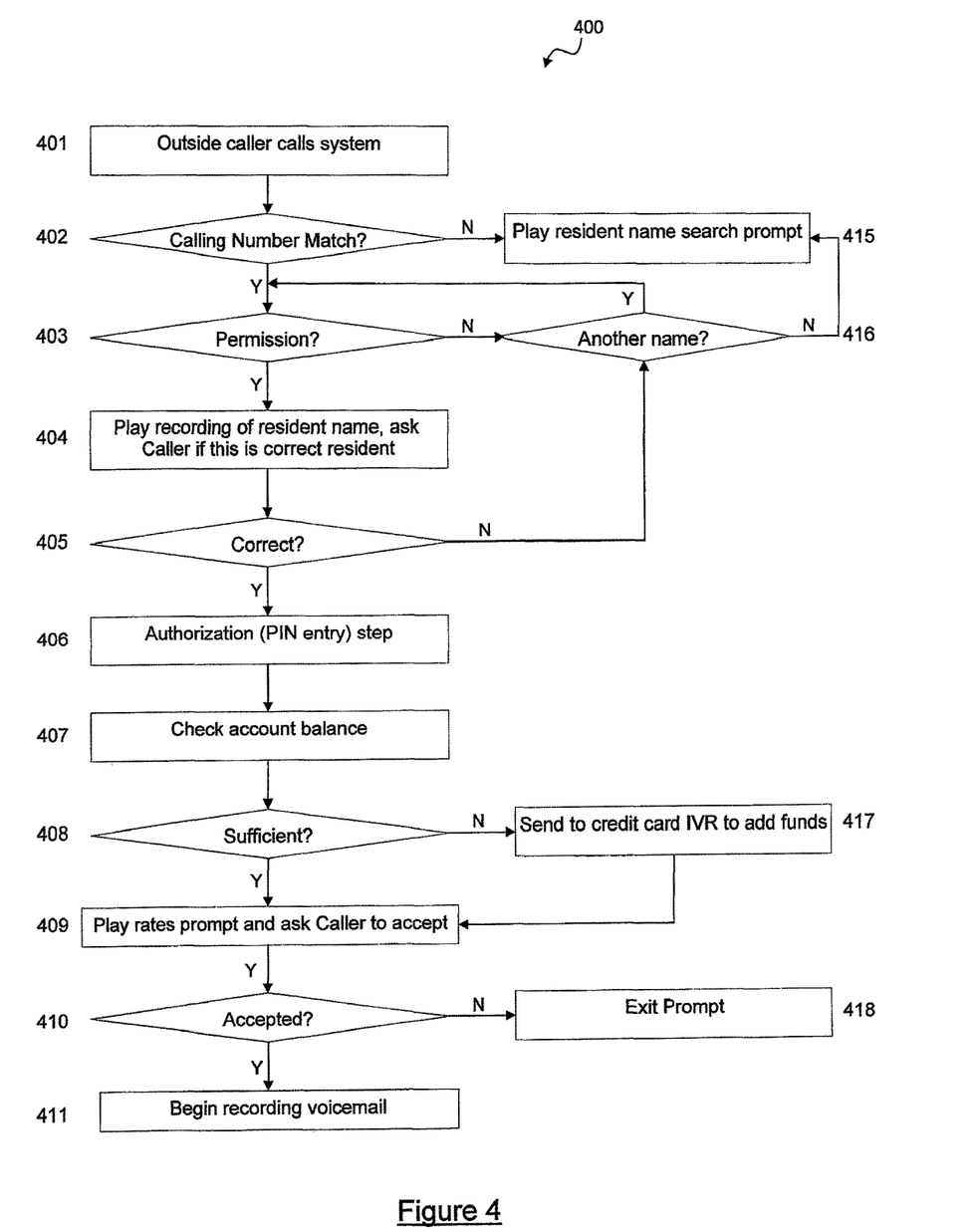
FIG. 4 is a flowchart illustrating an example process for leaving a voicemail message for a resident of a secure facility.

FIG. 4 is a flowchart illustrating the process 400 by which an outside caller 301 leaves a voicemail message for an inmate or other resident of the facility. At step 401, the outside caller 301 calls into the voicemail system, and is presented with an IVR menu. The outside caller 301 may use any telephone communications method to access the platform. For example, the caller may call the telephone number associated with the facility's voicemail system. When the caller is connected to the system, the system checks the global database 358 to determine if the calling phone number (detected using the automatic number information (ANI) within the call—similar to the "caller ID" process) has previously left a voicemail for a resident of any of the secure facilities serviced by the voicemail platform (step 402). If there is no match, the outside caller 301 is presented with the resident name search prompt (step 415) The resident name search process is described in more detail below in reference to FIG. 5.

If there is a match at step 402, the system checks the global database 358 to determine whether the resident matched to the outside caller 301 has permission to receive voicemail messages from the calling party (step 403). If the resident does not have permission, the system checks to see if there is another resident name associated with the calling party (step 416). If there are no other names available, then the outside caller 301 is presented with the resident name search prompt (step 415). If another name is available, the system returns to step 403 to determine whether the next named resident has permission to receive voicemail messages from the caller.

If there is permission and a resident record associated with the outside caller's number, a recording of the resident's name will play at step 404, and the IVR system will prompt the caller to confirm that this is the correct resident. If the caller responds that this is not the correct resident (step 405), the system proceeds to step 416 to again check for other associated resident records.

If the outside caller 301 affirms that the correct resident has been selected (step 405), the system may include an authorization step 406, where the outside caller must enter a PIN associated with the identified resident to proceed. The PIN verification can be enabled or disabled, and entry of the PIN may be required before an outside caller 301 is allowed to leave voicemail for a resident. This protects the integrity of the accounts that are identified in step 402. If a PIN is required and not entered, the process 400 terminates the call (not shown). As an example, the process could continue at step 418 (discussed below).

Next, at step 407, the system determines whether there are sufficient funds in the caller's account to leave a voicemail message. Voicemail messages may be charged on a per-message basis. The system may include different rates for different facilities, and the global database stores information on the rates of different facilities. If sufficient funds are not in the account (step 408), the outside caller 301 is directed to a credit card IVR menu (step 417) to add funds to the account. Once the caller has added money using the credit card IVR menu at step 417, or if there are already sufficient funds at step 408, then the caller will be quoted the cost of the voicemail message and will be asked to accept the charge (step 409). If the charge is denied, an exit prompt will be presented to the caller, or the caller may be returned to the main menu of the IVR (step 418). If the charge is accepted (at step 410), the caller will be allowed to leave a voicemail message at step 411.

Although not shown in FIG. 4, various options may be presented after an outside caller finishes leaving a voicemail message at step 411. For example, the caller may hang up, press a number to listen to the recording, erase the recording and start again, or cancel the recording. If a voicemail is canceled, funds will not be deducted from the caller's account.

Once a voicemail is recorded, it is stored in the global database 358 of the cluster 151-153 of the call processing center 150 serving the resident's facility. The database is updated to reflect that the voicemail is available and has not yet been played. The voicemail is associated with the resident's account, and will be available for review by investigators or customer servers representatives. The billing system deducts the price of the voicemail from the calling parties account, and billing records are updated to indicate the deduction.

Figure 5:
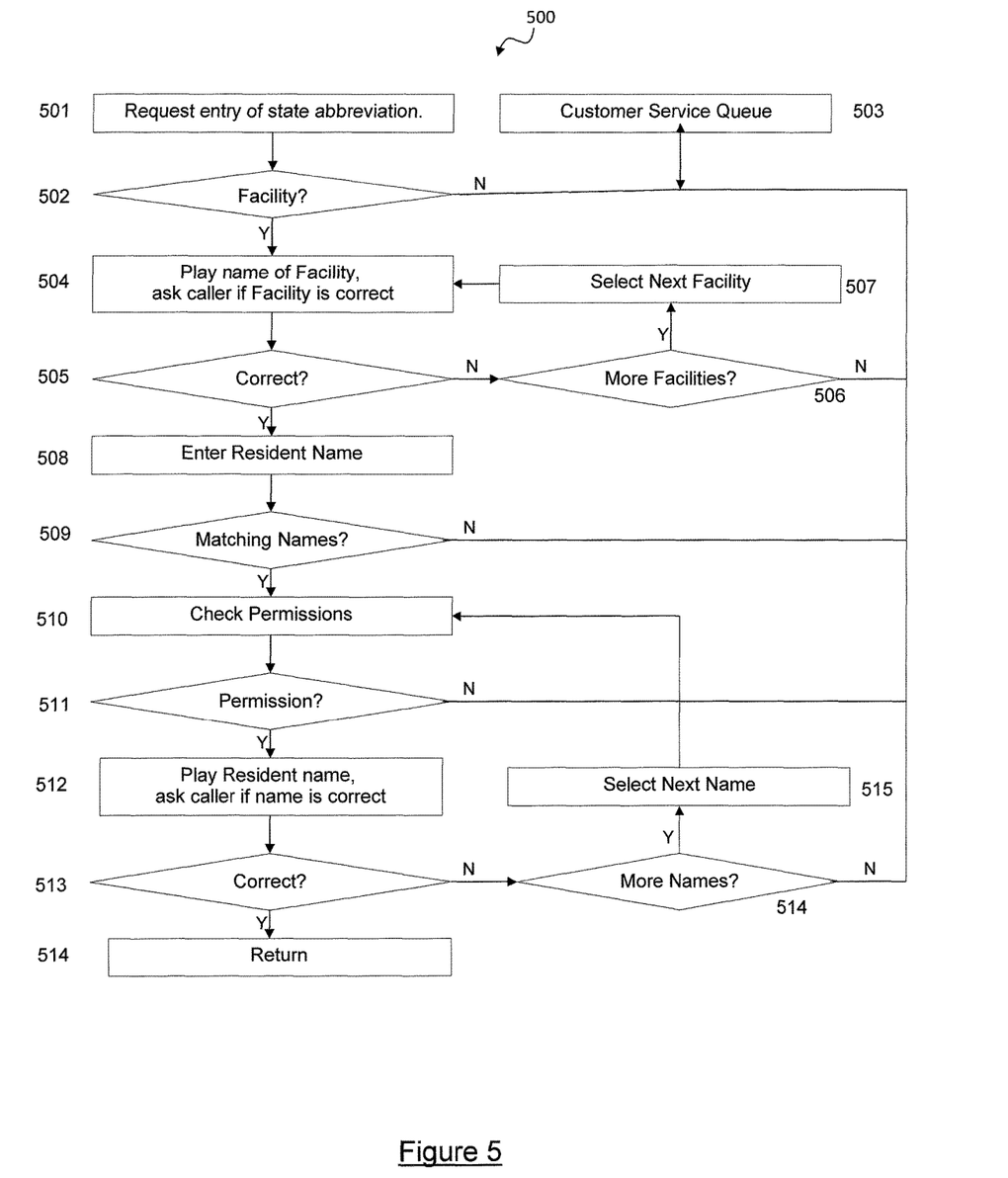
FIG. 5 is a flowchart illustrating an example process for conducting a resident name search.

FIG. 5 is a flowchart illustrating the process 500 for a resident name search, which may be carried out, for example, at step 415 of the FIG. 4 process or any other time the system must match a resident with an outside caller. When a resident name search is initiated by the outside caller 301 via the IVR prompts or step 415 (FIG. 4), the user is requested to enter a state abbreviation (step 501). As with all IVR voice prompts, entry can be performed via a telephone keypad, voice command, or other input method. Once the state is entered by the outside caller 301, the system will determine if there is a facility in the state that has been entered (step 502). If not, the outside caller 301 is transferred to a customer service queue at step 503. If a facility is identified, the name of the facility is played via the IVR interface, and the caller is asked to confirm that this is the correct facility (step 504). If the response of the caller is that this is not the correct facility (no at step 505) the system (at steps 506-507) will determine whether there are other facilities in the state, and announce the names of these facilities to the caller. If no additional facilities are identified, or if the caller indicates that none of the facilities are the correct facility, they will be placed in the customer service queue (step 503).

Once the caller has identified the correct facility (step 505), the system performs a similar process to identify the resident. That is, at step 508, the caller is requested to enter a resident name. The system checks for matching names (step 509) and, if there is a match, the system determines whether the resident has permission to receive calls from this caller (step 510). If there is no match at step 509, the resident is placed in the customer service queue (step 503). The caller is also placed into the customer service queue (step 503) if the resident does not have permission to receive calls (at step 511). If there is a match (at step 510) and the resident does have permission (at step 511), the IVR interface will play the resident's name and ask the caller if this is the correct name (step 512). If the caller indicates that this is not the correct name (no at step 513), the system will proceed to check for other matching names (step 514), select one of these names (step 515) and then check permissions for the other name (step 510). If the caller identifies this as the correct name (step 513), the system will, at step 516, return to the process that began the resident name search, such as e.g., the authorization step 406 of FIG. 4.

Figure 6:
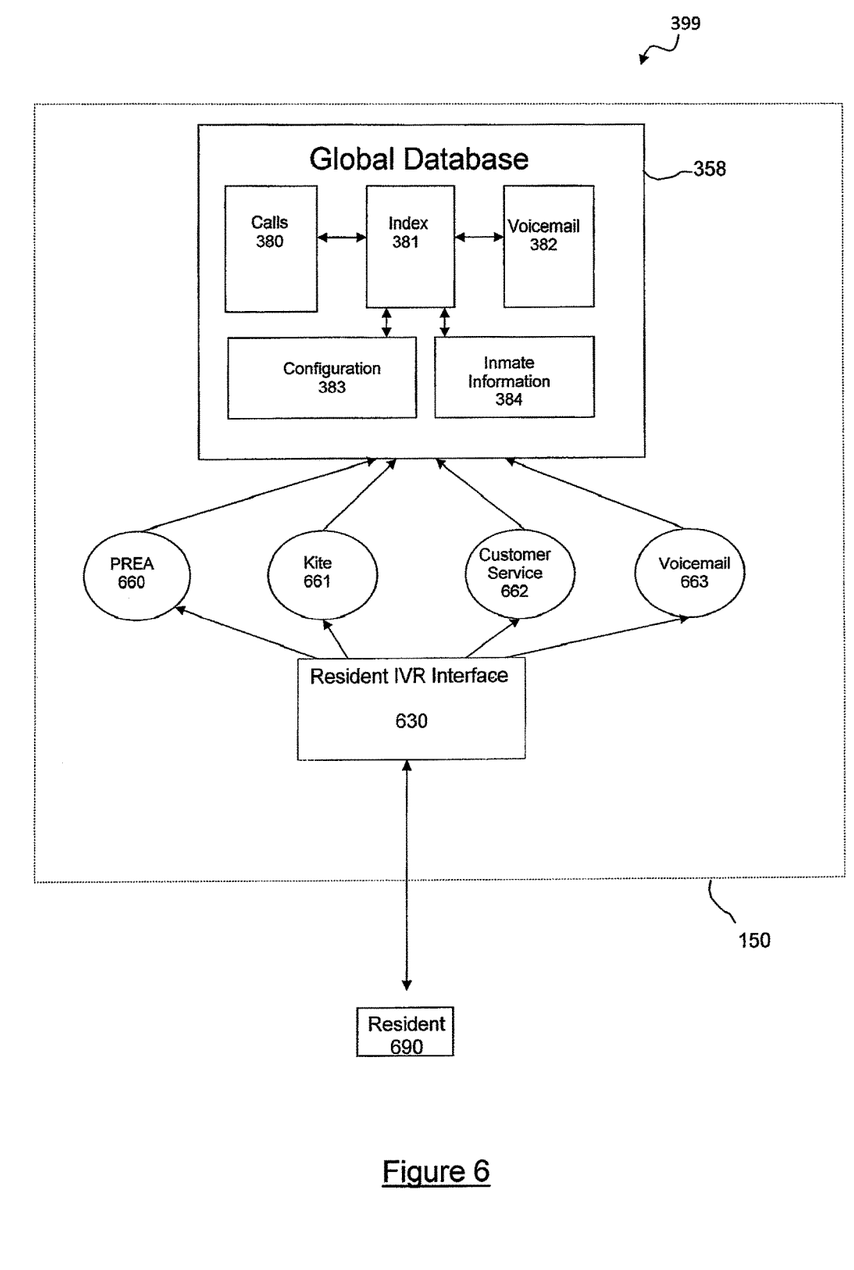
FIG. 6 illustrates an example embodiment of the voicemail platform and equipment used to provide access to a resident.

FIG. 6 illustrates an embodiment of the voicemail platform 399 and equipment used when an inmate or other resident of a secure facility accesses the platform. The voicemail platform includes features provided by the call processing center 150.

The resident 690 may access the consolidated voicemail platform 399 using a telephone system within the facility such as the one illustrated in FIG. 1. The platform 399 has a resident IVR interface 630 assigned to handle resident requests. To access the resident IVR interface 630, the resident 690 must first log on to the system. The resident IVR interface 630 prompts the resident 690 to enter a PIN assigned to that resident by the facility. The PIN identifies the resident to the system. For increased security of certain functions, the system can support an optional secondary PIN for each resident, the secondary PIN being used specifically for voicemail retrieval. That is, once the main PIN is entered, the resident would need to enter a second PIN to access the voicemail. The use of a secondary PIN may be enabled globally on a per facility basis or individually a per resident basis. In place of the secondary PIN, a voice biometric authorization can also be used. The voice biometric authorization matches a sample of a callers voice to a pre-recorded enrollment sample.

Once logged in to the resident IVR interface 630, the resident 690 is presented with various options. The resident may choose to access a Prison Rape Elimination Action (PREA) voicemail box 660. This allows residents to report rape and sexual abuse in a secure and confidential manner. By leaving reports via voicemail instead of paper, the system eliminates the need to store paper reports, yet still provides full, ID-verified accountability with the recorded message. The PREA voicemail box 660 expedites the ability to respond to the reported case.

A PREA voicemail is stored in the global database 358. The complaint is documented and facility staff are automatically notified of a new complaint via a web interface discussed in more detail below. The complaint is tracked and archived like any other call. The recording of the complaint allows third party "proof" of complaint, allowing facility staff to be audited in regards to their response and time to respond to the incident. Additionally, staff are protected against erroneous complaints. PREA complaints can be reviewed by facility staff, investigators, and other authorized parties through the web interface.

A resident may also choose to leave a Kite voicemail 661. Kites are normally a written form of communication within a jail system. Kites may be used to make requests for medical treatment, property issues, housing concerns, and communication with the court systems—probation, courts, and pre-trial services. The voicemail system allows residents to leave complaints or requests for facility administrators to review. A Kite voicemail 661 is stored in the global database 358 and can be reviewed by authorized users via a web interface.

Using the resident IVR interface 630, a resident may choose to leave a voicemail or report a problem by using the customer service prompt 662. The customer service prompt 662 is used to enter service requests using the IVR interface 630 or leave voicemails for telephone customer service related matters. This could include reports of malfunctioning equipment, requests for dropped-call refunds, voice ID reset requests, and other related items.

The voicemail platform 399 also automates certain aspects of customer service complaints. A resident may, for example, report that a connection was dropped during a call. Using the customer service prompts in the resident IVR interface 630. The resident IVR interface 630 will prompt the resident to enter the number of the dropped call. The system will automatically check to determine if the resident actually called the number they are reporting. If the number is not found in the resident's history, the refund request is automatically rejected. In addition, if the time required to report the dropped call has expired, the resident may be denied a refund request. These measures reduce the number of fraudulent dropped call requests. If the number was called and if the time to report the problem has not elapsed, the refund is granted and applied to the resident's account. The system can also enable human review of all dropped call requests prior to granting the refund. A customer service representative can retrieve and listen to the portion of the call where the dropped call was logged and verify that the call was dropped.

The customer service prompt 662 in the resident IVR interface 630 also enables a resident to request a reset of a voice ID. Voice ID resets are required because sometimes different phone equipment in different areas of a facility will impact the Voice ID signature. Also, since the same words must be spoken each time, sometimes residents forget what they said in their original recording. Customer service can review past recordings of the resident, and if the voice ID reset request is determined to be legitimate, the resident IVR interface 630 is updated so that the resident is allowed to re-record their voice identification clip the next time they access the system.

Figure 7:
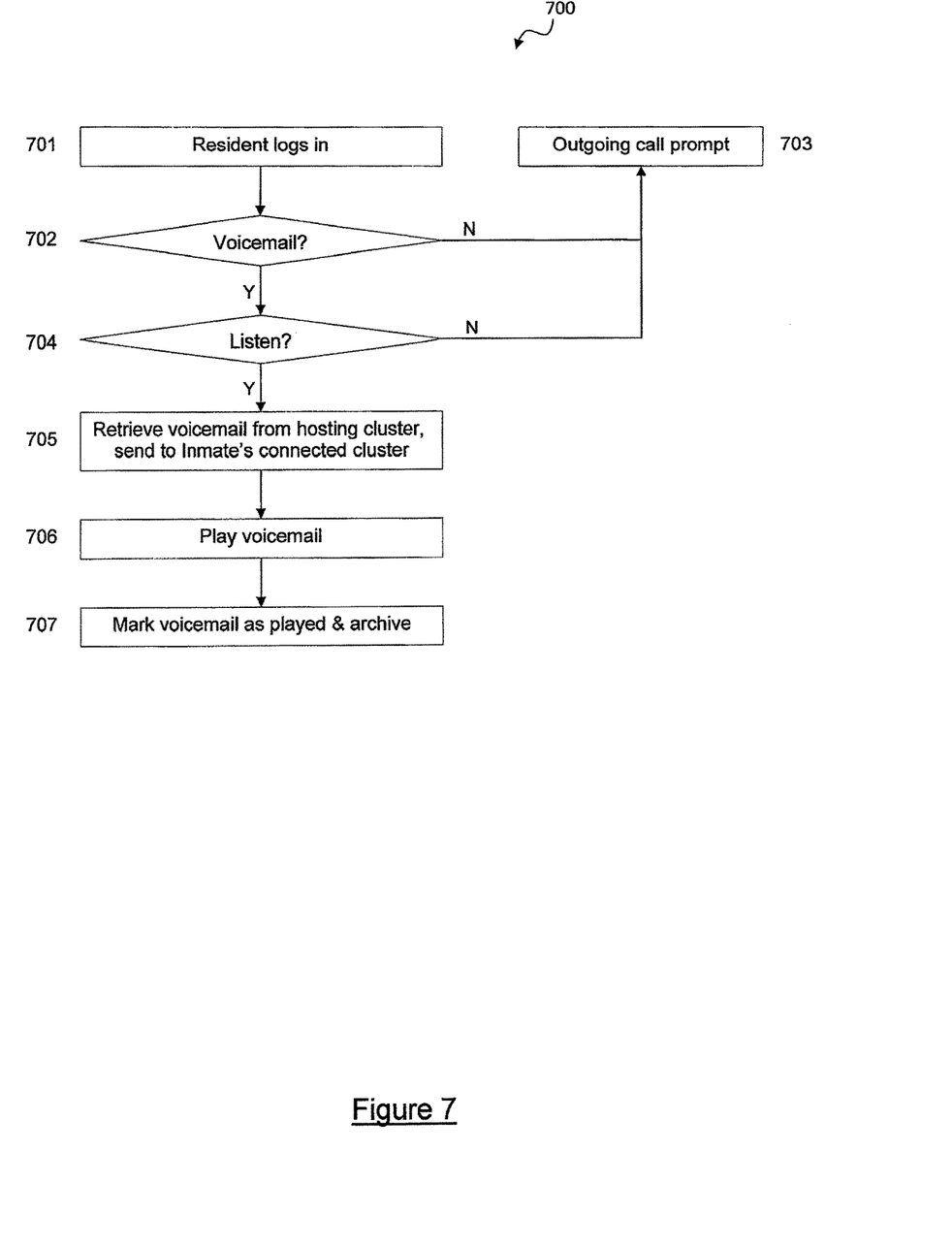
FIG. 7 is a flowchart illustrating an example process for retrieving voicemail messages.

The resident may also use the resident IVR interface 630 to retrieve voicemail messages 663. FIG. 7 is a flowchart illustrating an embodiment of the process 700 used when a resident retrieves voicemail messages. After a resident lifts the telephone receiver and logs into the system (step 701), the system determines whether the resident has voicemail messages that have not yet been listened to (step 702). If there are no messages, the resident is returned to the main IVR prompt, which may be an outgoing call prompt (step 703). If there is voicemail to be played, and if the resident selects to listen to the voicemail (step 704), then the system retrieves the resident's voicemail message(s) (step 705) from the global database 358. In doing so, the system may access a call processing cluster other than the cluster that the resident is currently connected to. If this is necessary, the voicemail message data is sent to the cluster currently accessed by the resident. Next, the voicemail message is played to the resident (step 706) and then, the voicemail is marked as played and stored as an archived message in the global database 358 (step 707). Depending on the settings at the facility, the resident may be prevented from replaying voicemails that have already been played.

Figure 8:
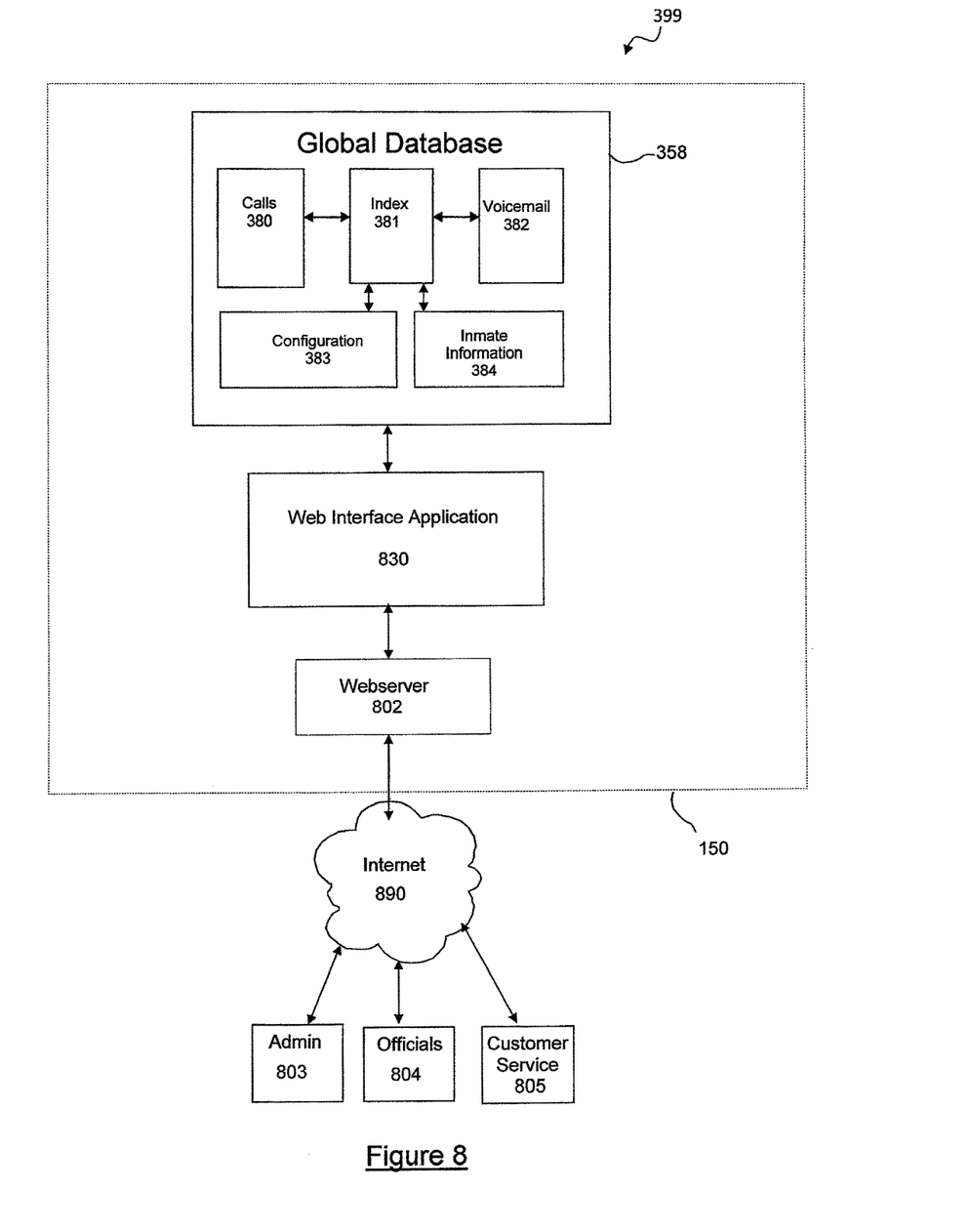
FIG. 8 illustrates an example embodiment of the voicemail platform and equipment used to provide access to a web interface of the voicemail platform.

FIG. 8 illustrates an embodiment of the voicemail platform 399 and equipment used to access a web interface for the voicemail platform 399. A webserver 802 may be accessed, via the Internet 890, by administrators 803, officials/investigators 804 or customer service personnel 805. These users are able to log onto a centralized voicemail web interface application 830 from any computer with an Internet browser using a user name and password. The web interface application 830 enables the configuration and monitoring of communications at any of the multiple facilities 100 (FIG. 1), depending on a user's authorization. The web interface application 830 may be stored on an application node 257 (FIG. 2) of a cluster 251-254 (FIG. 2) of the call processing center, and can pull data from the database node 258 (FIG. 2) of any available cluster.

Accessing the web interface application 830 via the webserver 802 enables users with appropriate permissions to configure options for a facility or individual residents. For example, the web interface application 830 controls options such as requiring a second PIN to retrieve voicemail, blocking use by an institutional user, or blocking a specific number from leaving a voicemail. Using the web interface application 830, authorized users can restrict access to voicemail based on the facility, resident, or incoming number. Any of the various configuration settings described herein can be set using the web interface application 830, provided a user has the appropriate authorization. Additionally, using the web interface application 830, customer service staff can review reports such as valid dropped call requests. A list of dropped call requests is displayed, and actions (such as a refund) can be taken on the account in question.

The web interface application 830 also provides certain users with access to the global database 358. The global database 358 stores recordings of calls 380 as well as voicemail recordings 382 and other information. The global database 358 includes an index 381, which indexes both types of recordings by institutional user, as well as by destination number. This enables officials/investigators 804 and administrators 803 to quickly search, locate, and listen to voicemails and call recordings for any institutional user in any facility. As described above, the global database may be distributed across several clusters of a call processing center 150.

The web interface application 830 prioritizes voicemails and calls into sortable lists, and enables playback of a recording via a computer. If Kite or PREA messages are available, certain users (i.e., officials or investigators) will be notified via the web interface application 830, by SMS message, or by email. The web interface allows facility officers to review the messages and record a response, which is placed in the resident's voicemail inbox and can be played back using the voicemail playback system. The web interface allows requests to be approved, delegated, transferred, or denied, and provides a full audit trail of all actions. In addition, since residents sign on using a PIN and possibly a secondary identification prior to leaving a message, positive ID is provided, reducing abuse and fraud.

The above description and drawings are only to be considered illustrative of specific embodiments, which achieve the features and advantages described herein. Modifications and substitutions for specific conditions and materials can be made. Accordingly, the embodiments are not considered as being limited by the foregoing description and drawings, but is only limited by the scope of the appended claims.

The invention claimed is:

1. A method of providing voicemail services of a secure facility, the method comprising:
   receiving a telephone call from a caller outside the secure facility, the telephone call being initiated by a calling telephone number;
   identifying the calling telephone number;
   comparing the calling telephone number with a list of telephone numbers associated with a plurality of residents;
   associating the calling telephone number with one of the plurality of residents when a match exists between the calling telephone number and a telephone number associated with the respective resident;
   determining if the caller has previously left a voicemail for the resident;
   determining whether the resident has permission to receive voicemail from the caller by accessing stored call permissions information containing permissible callers; and
   determining whether sufficient funds exist in an account associated with the caller;
   when the resident has permission to receive voicemail from the caller and sufficient funds exist in an account associated with the caller:
      receiving a voicemail message from the caller,
      storing the voicemail message on a database at a central call center that is outside the facility,
      receiving at the central call center, a request from the resident to retrieve the voicemail message,
      retrieving the voicemail message from the database,
      playing the voicemail message to the resident, and
      providing an administrator with access to the voicemail message; and
   when the resident does not have permission to receive voicemail from the caller:
      blocking the receipt of the voicemail, and
      blocking the storage of the voicemail on the database.

2. The method of claim 1, wherein the step of retrieving the voicemail message from the database includes retrieving the voicemail message from a database that is stored at a different geographic location than a computer that receives the request from the resident.

3. The method of claim 1, wherein the call permissions information is adjustable by the administrator.

4. The method of claim 1, further comprising receiving a PIN number associated
   with the resident from the caller.

5. A method of providing an incoming call to a resident of a secure facility, the method, the method comprising:
   receiving an incoming call from a caller outside the secure facility, the incoming call being initiated by a calling telephone number;
   identifying the calling telephone number;
   comparing the calling telephone number with a list of telephone numbers associated with a plurality of residents;
   associating the calling telephone number with one of the plurality of residents when a match exists between the calling telephone number and a telephone number associated with the respective resident;

determining if the caller has previously left a voicemail for the resident;

determining whether sufficient funds exist in an account associated with the caller; and determining whether the resident has permission to receive a voicemail from the caller by accessing stored call permissions information containing permissible callers;

when the resident has permission to receive voicemail from the caller and sufficient funds exist in an account associated with the caller:

determining a current location of the resident, alerting the resident, at the current location, of the incoming call, receiving a voicemail message from the caller, and receiving a request from the resident to be connected to the incoming call and connecting the resident to the incoming call; and when the resident does not have permission to receive voicemail from the caller, blocking the incoming call.

6. The method of claim 5, alerting the resident comprises playing a distinctive ring of multiple different rings wherein each resident is assigned a different ring of the multiple rings.

7. The method of claim 5, wherein if all available phones are currently in use at the current location, the caller is provided an option to leave a voicemail for the resident.

8. The method of claim 6, wherein if all available phones are currently in use at the current location, the caller is provided an option to leave a voicemail for the resident.

9. The method of claim 5, wherein the call permissions information is adjustable by the administrator.

10. The method of claim 5 further comprising receiving a PIN number associated with the resident from the caller.

* * * * *